United States Patent [19]

Akerson

[11] Patent Number: 4,564,896
[45] Date of Patent: Jan. 14, 1986

[54] INVERTER WITH IMPROVED OPERATING EFFICIENCIES

[75] Inventor: Steven C. Akerson, Federal Way, Wash.

[73] Assignee: Heart Interface Corporation, Federal Way, Wash.

[21] Appl. No.: 626,318

[22] Filed: Jun. 29, 1984

[51] Int. Cl.$^4$ ............................................. H02H 7/122
[52] U.S. Cl. ........................................ 363/56; 363/26; 323/269
[58] Field of Search ........................ 363/24, 25, 26, 56, 363/55, 97, 133, 134; 323/269, 272; 307/570

[56] References Cited

U.S. PATENT DOCUMENTS

| | | | |
|---|---|---|---|
| 3,564,393 | 2/1971 | Williamson | 363/21 |
| 3,670,234 | 6/1972 | Joyce | 363/56 |
| 3,843,919 | 10/1974 | Yamamura et al. | 363/25 |
| 3,859,586 | 1/1975 | Wadlington | 363/25 |
| 3,946,301 | 3/1976 | Love | 363/56 |
| 3,974,437 | 8/1976 | Patel et al. | 363/71 |
| 4,054,830 | 10/1977 | Harrel | 323/269 |
| 4,159,515 | 6/1979 | Walkawiak | 363/55 |
| 4,300,191 | 11/1981 | Baranowski et al. | 363/17 |
| 4,317,165 | 2/1982 | Sullivan | 363/41 |
| 4,336,587 | 6/1982 | Boettcher, Jr. et al. | 363/56 |
| 4,342,076 | 7/1982 | Rosswurm et al. | 363/56 |
| 4,380,795 | 4/1983 | Lee et al. | 363/131 |
| 4,439,806 | 5/1984 | Brajder | 363/50 |
| 4,502,104 | 2/1985 | Mitchell | 363/26 |

Primary Examiner—Peter S. Wong
Assistant Examiner—Judson H. Jones
Attorney, Agent, or Firm—Kolisch, Hartwell & Dickinson

[57] ABSTRACT

An inverter circuit is provided for use with a DC power supply and includes a transformer having a center-tapped primary coil and a secondary coil as well as a switch and a switch controller operating to maintain a constant RMS output voltage. Improvements in the inverter circuit include a switch formed of individual discrete and Darlington transistors connected in parallel so that the discrete transistors predominantly carry the load during low load operation and the Darlington transistor during high load operation. A switch controller controls the switch using pulse width modulation and may include generation of a signal providing a first-order linear approximation of the mean square voltage on the output as determined on the non-load side of the primary coil of the transformer, a switch driver controller which keeps the transistors of the switch operating just barely at saturation, and a near no-load circuit which substantially reduces the operating time of the switches while maintaining minimal energy output. Further, spike suppression means is provided for returning spike energy to the battery supply. Also, a circuit protector, sensing the voltage across the transistors, determines when an excessive load is being drawn and reduces the operation of the switches to a level which they can tolerate for a period of time before completely effectively breaking the circuit from operation.

14 Claims, 4 Drawing Figures

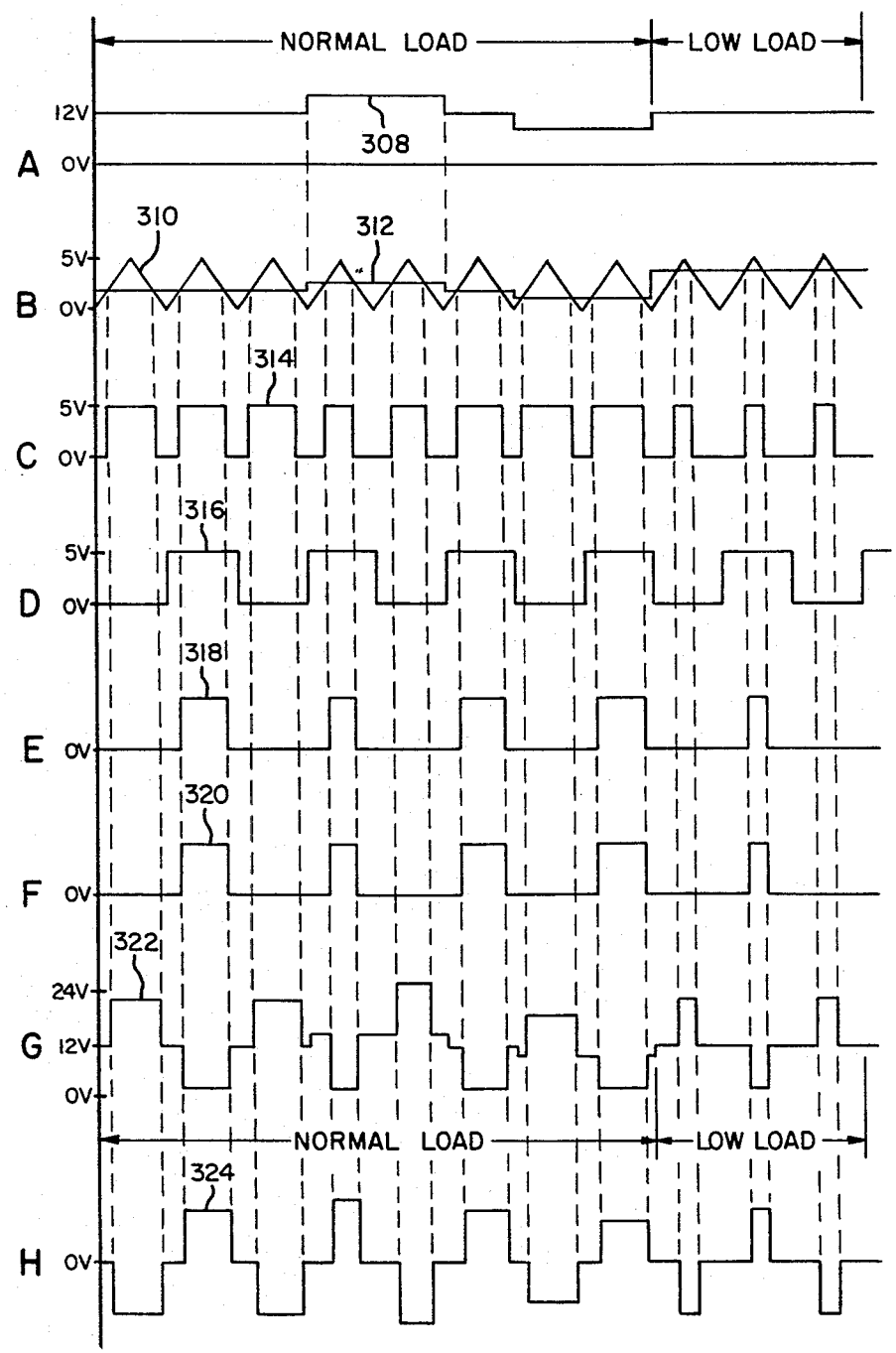

INVERTER WITH IMPROVED OPERATING EFFICIENCIES

BACKGROUND AND SUMMARY OF THE INVENTION

This invention pertains to a voltage inverter circuit usable with a DC power supply, and more particularly, to such an inverter circuit having improved efficiency of operation provided by discrete and Darlington transistors connected in parallel for selective operation, by generating a pulse width modulated signal representative of a first order linear approximation of the output RMS voltage as determined from a non-load side of a power transformer, by low-load pulse width control circuitry for substantially reducing the output power generated during near no-load conditions, by protection circuitry which reduces the operation of the circuit to a level non-destructive of the circuit components during excessive load conditions, or by suppression circuitry which feeds energy from voltage spikes back into the DC power supply.

Voltage inverters typically invert a DC voltage (for example, the 12, 24 or 48 volts typically found in motor vehicles and other portable equipment) to an AC voltage, such as 117 volts RMS at 60 Hz. Such inverters make it possible to provide AC power to equipment requiring alternating power from a DC power supply which is typically portable and isolated from an utility electric power distribution system.

A wide variety of inverter circuits exist. Some circuits are single ended and others are of a push-pull type having a center-tapped transformer. In order to obtain alternating current on the secondary of the transformer it is necessary to drive current through a primary coil or coils alternately in reverse directions. With the advent of transistors, electronic switching of the current through the coil has been achieved by using transistors as switches. Typically for low power considerations individual or discrete transistors are used as the switching element. For high power applications, Darlington-configuration transistors have been used.

Also, in order to regulate the operation of the switches to provide a fairly continuous output load, the load is measured on the secondary coil with sensed changes being used to control the operation of the switches on the primary side of the transformer. Otherwise, typically, the switches are controlled in order to maintain them relative to a reference source or voltage without monitoring the actual secondary voltage output.

The U.S. patent to Williamson (U.S. Pat. No. 3,564,393) discloses a single-sided inverter which measures what is termed a flyback voltage supplied to a capacitor as reflected on the primary coil. This voltage is then compared to a reference voltage for generating a pulse width control signal.

Other conventional inverters have complex feedback circuits which measure the RMS of the output voltage for generating a control signal. Also, during very low-load conditions, circuits typically dissipate a significant amount of energy in the switching elements even though very little load is transmitted to the secondary coil for output. Circuit protection portions of inverters conventionally disable the working circuit as soon as an excessive load is detected. This does not allow for continued operation of the circuit while measures are taken to correct the overload condition.

In the preferred embodiment of the instant invention, an inverter circuit is provided which has a pair of discrete transistors connected in parallel with a Darlington transistor with a current apportioning voltage divider connected between their respective bases. It further includes a transistor switch controller which senses the voltage on the non-load side of the primary coil of a transformer for generating a pulse width modulated signal which is a first order linear approximation of voltage on the secondary or output coil. A low-load sensing circuit reduces the pulse width of the control signal to the transistor switches to about ⅓ of its normal width. High current protection is provided in a circuit which senses when the power through the switch exceeds a maximum level. When it does, the control signal pulse is reduced to a very narrow pulse which is not of sufficient duration to harm the transistor switches. This narrow pulsing continues until either the problem causing the overload condition is removed from the secondary coil or a disabling circuit prevents any further operation of the transistor switches. Finally, a spike suppression circuit is provided which stores energy from voltage spikes caused by the switching operation and feeds them back to the power supply through a transistor.

It can be seen that such a circuit provides for improved efficiency of operation by using discrete transistors as switches during low-load conditions and saving the Darlington transistors for the high load operation when they are more efficient. Further, the low-load pulse width limiting circuit provides for continued operation of the system during near no-load conditions while maintaining an output at the desired voltage. The circuit protection provided in this circuit ensures that the transistor switches will not operated beyond their power capabilities. Further, it has the inherent advantage of being useful for starting motors when current required is typically higher than normal operating currents by starting the motors very slowly and bringing them up to speed. This permits starting larger motors than otherwise would be possible. Further, energy is saved by feeding back a substantial portion of the energy occurring in the inevitable switching spikes. These and other objects and advantages of the present invention will be more clearly understood from a consideration of the drawings and the following detailed description of the preferred embodiment.

BRIEF DESCRIPTION OF THE DRAWINGS

FIG. 3 shows voltage waveforms occurring during operation of the circuit at selected points within the circuit of FIG. 2.

DETAILED DESCRIPTION OF THE INVENTION

Figure 1:
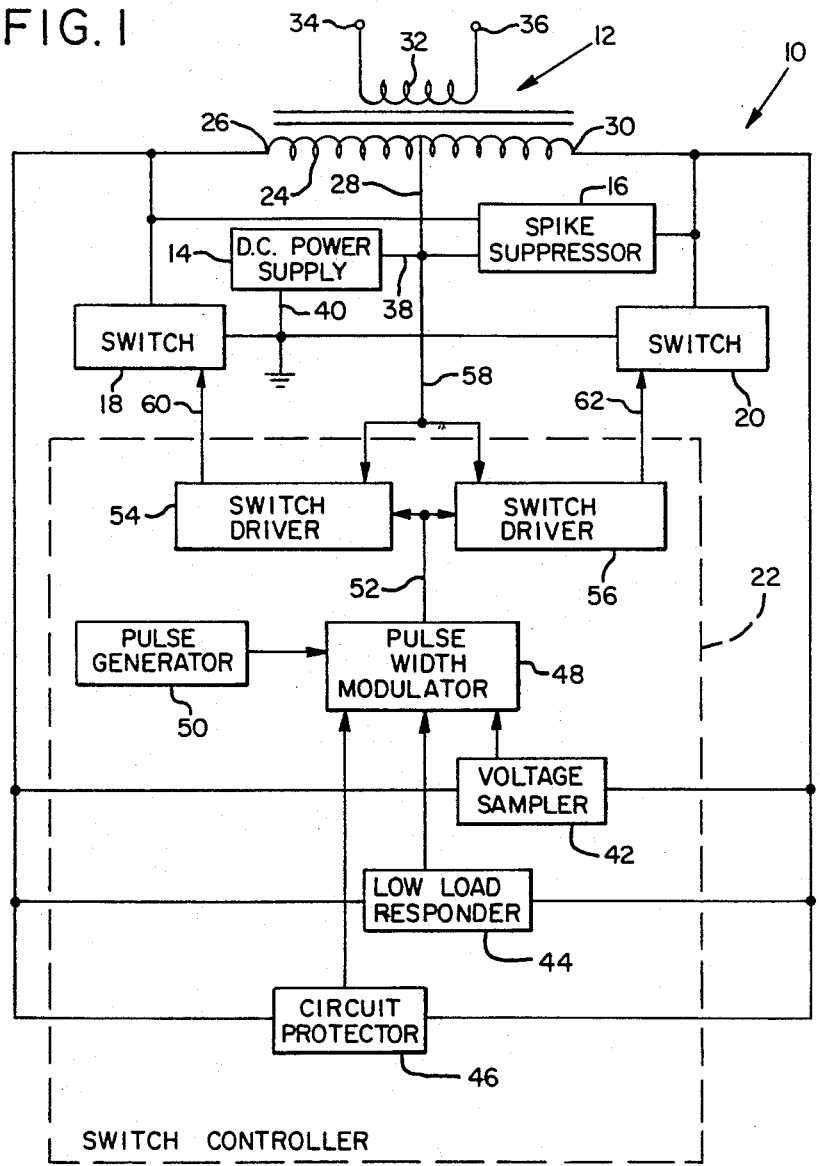
FIG. 1 is a block schematic diagram showing the major components of an inverter made according to the present invention.

Referring initially to FIG. 1, an inverter shown generally at 10 made as contemplated by this invention includes a center-tap transformer, shown generally at 12, a DC power supply 14, a spike suppressor 16, a pair of switches 18, 20 and a switch controller 22 shown in dashed outline. The inverter without power supply 14 is also referred to as an inverter circuit.

Transformer 12 includes a primary coil 24 having a left end tap 26, a center tap 28 and a right end tape 30, as shown. The transformer also includes a secondary coil 32 having output terminals 34, 36.

Power supply 14 has a 12 voltage DC output voltage with a positive lead on a terminal 38 and a negative or grounded lead on a terminal 40.

Switch 18, also referred to as switch means, is connected to left transformer end tap 26 as well as to supply terminal 40. Switch 20 is connected to primary end tap 30 and to terminal 40. Spike suppressor 16 is connected between the end transformer taps as well as to center tap 28.

Switch controller, or switch controller means, 22 includes a voltage sampler 42, a low-load responder 44, and a circuit protector 46 each of which have connections to each end tap of transformer 12. These three circuits each provide an input into a pulse width modulator, or modulation means, 48 which receives pulses from a reference pulse generator, or generator means, 50. Modulator 48 provides what is referred to as an intermediate signal on a lead 52 which is connected to a pair of switch drivers, or driver means, 54, 56. The two drivers are both connected to terminal 38 of the DC power supply through a lead 58. Further, drivers 54, 56 are connected through leads 60, 62, respectively, which transmit what is referred to as a switch controller signal to switches 18, 20, respectively.

Figure 2A:
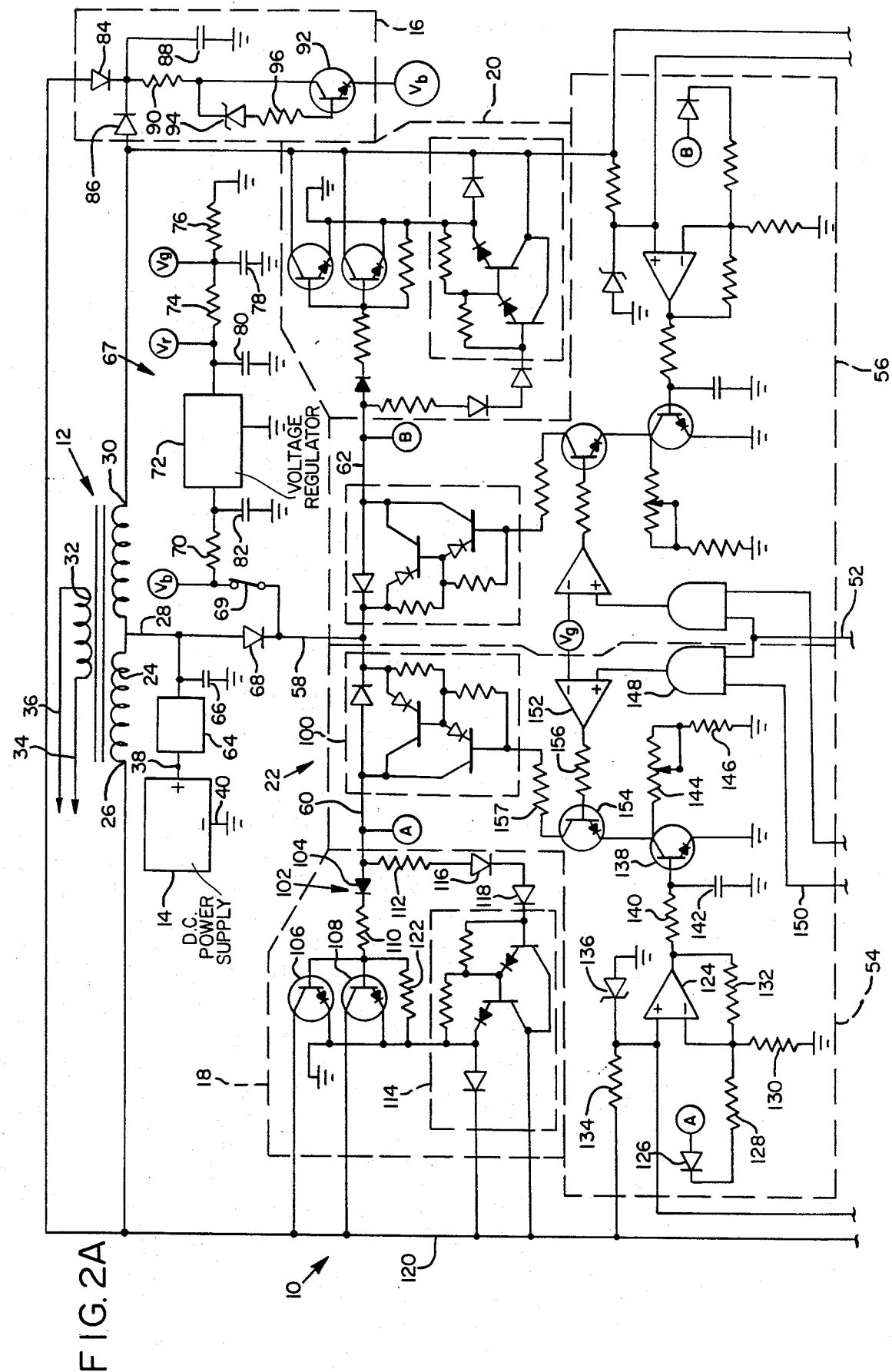
FIGS. 2A and 2B show the detailed circuit making up the inverter of FIG. 1.
Figure 2B:
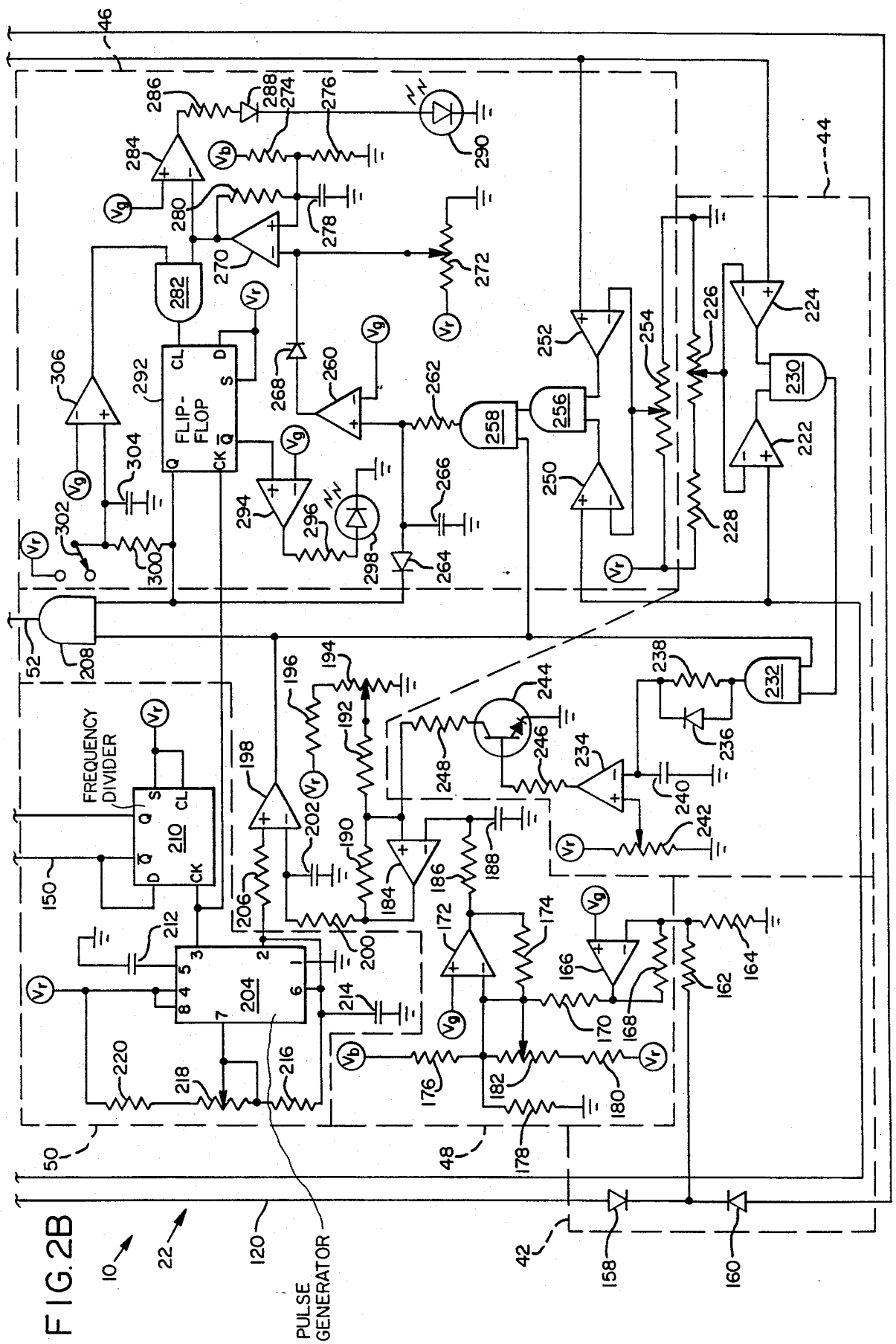

Reference is now made to FIGS. 2A and 2B which show in detail the circuit shown in FIG. 1. FIG. 2A in particular shows transformer 12, power supply 14, spike suppressor 16, switches 18, 20 and switch drivers 54, 56.

Power supply 14 is connected at its positive terminal 38 through a 100 amp circuit breaker 64 to center tap 28 and to ground through a 2200 microfarad, 16 volt, capacitor 66. It is also connected to a control circuit power supply shown generally at 67 through a diode 68 and an on/off switch 69. The cathode of diode 68 is connected to lead 58. The battery voltage, shown as $V_b$, nominally has a value of 12 volts. A voltage divider circuit containing a 27 ohm, 2 watt resistor 70, a 5 volt, ½ amp voltage regulator 72 and two 10 kiloohm resistors 74, 76 connected in series to ground, as shown. This provides a 5 volt reference voltage at $V_r$ and a 2.5 volt nominal "ground" at $V_g$. The ends of resistor 74 are also connected to ground through 0.1 microfarad capacitors 78, 80. The low voltage end of resistor 70 is also connected to ground through a microfarad capacitor 82.

Spike suppressor, or suppression means, 16, shown at the right margin of FIG. 2A includes a pair of diodes 84, 86, joined at their anodes to transformer end taps 26, 30, respectively. The cathodes of the two diodes are joined and connected to ground through a 1,000 microfarad, 50 volt, capacitor, or capacitor means, 88. The junction between the diodes is also connected to the battery through a 1 ohm, 10 watt resistor 90 connected to the collector of a transistor (MJ 802) 92, also referred to as power draining transistor means. The emitter of the transistor is connected to the battery. Connected between the collector and base of the transistor is an 18 volt, 5 watt zener diode 94. A ½ watt, 47 ohm resistor 96 is connected between the anode of the zener diode and the base of transistor 92.

It will be noted that the circuits for switch driver 56 and associated switch 20 is a mirror image of switch driver 54 and switch 18. In order to simplify the following discussion, it will therefore be understood that the description of switch driver 54 and switch 18 will also apply to the other switch driver and switch.

A Darlington transistor (TIP 127) 100 is connected at its emitter terminal to lead 58. The collector terminal is connected to lead 60 which is also shown as reference A. The corresponding lead reference in switch driver 56 is shown as B. Lead 60 is connected to switch 18 through a current divider, also referred to as current divider means, shown generally at 102. Divider 102 includes what is referred to as a discrete transistor portion which consists of a diode 104 connected at its anode to lead 60 and at its cathode to the bases of a pair of discrete transistors, or discrete transistor means, 106, 108, through a ½ ohm, 20 watt resistor 110. What is referred to as a Darlington transistor portion or other portion of divider 102 is a 1 ohm, ½ watt, resistor 112 connected at one end to lead 60 and at its other end to the base terminal of a power Darlington transistor, or Darlington transistor means, (MJ 11048) 114 through a pair of diodes 116, 118, as shown.

The collectors of discrete transistors 106, 108 and Darlington transistor 114 are all connected to transformer end tap 26 through a lead 120. The emitters of the respective transistors are also connected to circuit ground. Further, a 47 ohm, ½ watt resistor 122 is connected between the base and the emitter of transistors 106, 108.

Lead 60 is also connected to the negative terminal of an op amp 124 through a diode 126 connected in series with a 22K ohm resistor 128. (All op amps and logic gates are 324 7408 or 7474, 4SCLS.) The negative input terminal is also connected to ground through a 15K resistor 130 and to the op amp output terminal through a 200K ohm resistor 132.

The positive input terminal of the op amp is connected to lead 120 through a 10K ohm resistor 134 and is further connected to ground through a 5 volt zener diode 136.

The output of op amp 124 is connected to the base of a common-emitter transistor (PN 2222) 138 through a 100K ohm resistor 140. The base of the transistor is connected to ground through a 0.01 microfarad capacitor 142. The collector of transistor 138 is connected to ground through a 10K ohm variable resistor 144 and a 6.8K ohm resistor 146 connected in series.

An AND gate 148 is connected at its inputs to lead 52 and another lead 150 which is connected to a pulse generator to be described in further detail with reference to FIG. 2B. The output of gate 148 is connected to the positive input terminal of a comparator 152. The negative input to the comparator is connected to $V_g$ as a reference. The output of comparator 152 is connected to the base terminal of a transistor (PN 2222) 154 through a 1K ohm resistor 156. The emitter of transistor 154 is directly connected to the collector of transistor 138. The collector of transistor 154 is connected to the base input terminal of Darlington transistor 100 through a 1K ohm resistor 157. This completes the description of switch driver 54.

Referring now to FIG. 2B and continuing the discussion of switch controller 22 generally, and describing specifically voltage sampler 42, the primary coil end taps 26, 30, and therefore the collectors of switches 18, 20, respectively, are connected to the anodes of a pair of diodes 158, 160, respectively shown in the lower left portion of the figure. The cathodes of these diodes are both connected to ground through the series connection of a 594K ohm resistor 162 and a 120K ohm resistor 164.

The value of resistor 162 may be achieved by connecting a 680K ohm resistor in parallel with a 4.7 megohm resistor.

The junction between resistors 162, 164 is connected to the negative input of an op amp 166. The positive terminal of this op amp is connected to the nominal ground, $V_g$. A 100K ohm feedback resistor 168 connects the output to the negative input of the op amp. The output of op amp 166 is connected through another 100K ohm resistor 170 to the negative input of another op amp 172. Again, the positive input to this op amp is connected to reference voltage $V_g$ and further has a 220K ohm feedback resistor 174 connecting the output of the op amp to the negative input.

The negative input to op amp 172 is also connected to a voltage divider network which includes a 594K ohm resistor 176 connected between the input terminal and battery voltage $V_b$. The input terminal is also connected to ground through a 120K ohm resistor 178. It is further connected to the 5 volt reference voltage $V_r$ through a 100K ohm resistor 180 connected in series with a 100K ohm variable resistor 182.

The output of op amp 172 is connected to the negative input of another op amp 184 through a 150K ohm resistor 186. This negative input is also connected to ground through a 1 microfarad capacitor 188. The positive input to op amp 184 is connected to low-load responder 44 which will be described shortly. It is also connected through a 100K ohm feedback resistor 190 to the input of op amp 184. Further, the positive input is connected through a 10K ohm resistor 192 to the tap of a 10K ohm potentiometer 194. Potentiometer 194 is connected at one end to ground and at the other end to reference voltage $V_r$ through a 10K ohm resistor 196.

The output of op amp 184 is connected to the negative input of another op amp 198 through a 100K ohm resistor 200. This negative input is also connected to ground through a 0.1 microfarad capacitor 202. Completing a description of pulse width modulator 48, op amp 198 is connected at its positive terminal to pin 2 of a pulse generator (555) 204 through a 100K ohm resistor 206. The output of op amp 198 is coupled as an input to an AND gate 208. The output of gate 208 is connected to lead 52 which has been discussed previously.

Pulse generator 204 is a portion of what is referred to as pulse generator means or simply as pulse generator 50. As can be seen in the figure, pin 1 is grounded. Pin 2 is connected to resistor 206 as was just described. Pin 3 is connected to the clock (CK) terminal of a frequency divider (7474a) 210. Terminals 4 and 8 are connected directly to 5 volt reference voltage, $V_r$. Terminal 5 is connected to ground through a 0.1 microfarad capacitor 212. Terminal 6 and 2 are connected to ground through another 0.1 microfarad capacitor 214. Terminals 2 and 6 are also connected to reference voltage $V_r$ through a series connection of a 54K ohm resistor 216, a 20K ohm variable resistor 218 and a 100K ohm resistor 220. Terminal 7 is connected to the junction between resistor 216 and variable resistor 218.

The S and CL terminals of the frequency divider are connected to reference voltage $V_r$. Terminal D is connected to inverted output $\overline{Q}$ which is connected to lead 150. Output Q is connected to a lead similar to lead 150 which is connected to an AND gate in switch driver 56 similar to gate 148 in switch driver 54.

Directing attention now to low-load responder 44, a pair of differential amplifiers 222 and 224 are connected at their positive or non-inverting input terminals to the collectors of the switch transistors through resistors. In the case of amplifier 222 this resistor is resistor 134 shown in switch driver 54 in FIG. 2A. The inverting inputs to these two amplifiers are connected in common to the tap of a 10K potentiometer 226. This potentiometer is connected at one end to ground and at the other end to reference voltage $V_r$ through a 12K ohm resistor 228.

The output of amplifiers 222 and 224 are each connected to the inputs of an AND gate 230 the output of which forms an input to another AND gate 232. The other input to gate 232 is connected to the output of gate 198. The output of gate 232 is connected to the inverting side of an op amp 234 through a parallel connection of a diode 236, the anode of which is connected to gate 232, and a 12K ohm resistor 238. The inverting input terminal to op amp 234 is also connected to ground through a 10 microfarad capacitor 240. The non-inverting input terminal is connected to the tap of a potentiometer 242 which is connected between ground and reference voltage $V_r$.

The output of op amp 234 drives the base of a common-emitter transistor (PN 2222) 244 through a 10K ohm resistor 246. The collector is connected to the non-inverting input of op amp 184 through a 2.2K ohm resistor 248. This completes the structural description of low-load responder 44.

The final circuit portion to be described is the circuit protector 46 shown in FIG. 2B. Two op amps 250, 252 have their non-inverting input terminals connected to the non-inverting input terminals of op amps 222, 224, respectively. The inverting input terminals of the two op amps are connected to the tap of a 10K ohm potentiometer 254 which is connected between ground and reference voltage $V_r$.

The output of the two op amps provide the inputs to an AND gate 256. The output of this AND gate along with the output from op amp 198 provides the two inputs to another AND gate 258. The output of this latter gate is connected to the non-inverting input of an op amp 260 through a 6.8K ohm resistor 262. The same non-inverting input is also connected to an input of AND gate 208 through a diode 264. That input is also connected to ground through 0.1 microfarad capacitor 266.

The inverting input to op amp 260 is connected to the nominal ground reference voltage $V_g$. The output of the op amp is connected through a diode 268 to the inverting input of another operational amplifier 270. That input is also connected to the tap of a 10K ohm potentiometer 272 connected between $V_r$ and ground.

The non-inverting input to op amp 270 is connected to the connection between a pair of resistors forming a voltage divider with a 330K ohm resistor 274 connecting the terminal to battery voltage $V_b$ and a 100K ohm resistor 276 connecting it to ground. Resistor 276 is connected in parallel with a 33 1 microfarad capacitor 278. A 1 megohm resistor 280 forms a feedback path between the output of op amp 270 and the non-inverting input.

The output of op amp 270 forms the input of an AND gate 282 as well as an inverting to an op amp 284. The non-inverting input to op amp 284 is connected to nominal ground reference $V_g$. The output of this op amp is connected to ground through a 180 ohm resistor 286, a diode 288 connected as shown, and an LED 290.

The output of gate 282 is connected to the "clear" (CL) terminal of a flip-flop (7474b) 292. Both the D and S terminals of the flip-flop are connected to reference voltage $V_r$. The clock (CK) input is connected to terminal 3 of pulse generator 204. The inverse output terminal $\overline{Q}$ is connected to the non-inverting input of an op amp 294. The inverting input is connected to nominal ground reference $V_g$. Its output is connected to ground through a 300 ohm resistor 296 and an LED 298.

Output of Q flip-flop 292 is the input of gate 208 which is connected to the cathode of diode 264. The same output is also connected to reference voltage $V_r$ through a 100K ohm resistor 300 in series with a normally open switch 302. The connection between the resistor and switch is also connected to ground through a 100 microfarad capacitor 304. The same connection is connected to the non-inverting input of an operational amplifier 306. The inverting input to this amplifier is connected to nominal ground reference $V_g$. Its output is connected to and forms the second input to gate 282. This completes a structural description of circuit protector 46 as well as the entire inverter 10.

OPERATION

Spike Suppressor 16

Because the power transistors in switches 18, 20 turn off very quickly, large spikes can appear from the inductance of transformer 12 which can cause secondary breakdown in the power transistors. Diodes 84, 86 feed the spikes into the 1,000 microfarad capacitor 88. Transistor 92 drains the charge off this capacitor over the rest of the cycle down to 18 volts, at which time zener diode 94 turns off the transistor. The capacitor absorbs the extremely high current spike which would be difficult to do with just the transistor. It should further be noted that the transistor feeds the spike current back into the battery instead of to ground in order to conserve on energy, and thereby enhance the efficiency of the inverter.

Pulse Generation

Switch 69 is used to turn the circuit on. When it is on, the signal starts with a 120 Hz. square wave generated by pulse generator 204 on pin 3. This frequency is established by resistors 216, 218 and 220. The output clocks flip-flop 210 to produce a 60 Hz. square wave on lead 150. An inverse wave is generated on the lead connected to output Q. The waveform on lead 150 alternately turns on AND gate 148 assuming its other input is also high.

Output 2 of the pulse generator is a triangle wave which is fed to comparator 198 and compared with the output of op amp 184 as will be described in further detail subsequently. Thus, the output of comparator 198 is a pulse whose duty cycle is controlled by the output of op amp 184. This is gated through AND gate 208 and "anded" again at gate 148.

Reference should be made at this point to FIG. 3 which shows the waveforms at various points in the circuit. The voltages applied by the battery is represented by waveform 308 shown in FIG. 3A. It will be noted that each time division shown is approximately ½ cycle with a 12-volt battery supply voltage being applied during the initial 1½ cycles. During the following cycle a somewhat higher voltage is applied, followed by ½ cycle of normal voltage and then a cycle of below 12-volt supply voltage. The last cycle and a half are at 12-volts supply voltage but are assumed to be at an extremely low-load or near 0 load condition. The triangle wave 310 included in FIG. 3B represents the input received on comparator 198 from generator 204. As will become apparent in the subsequent discussion the other waveform 312 shown in the same figure represents the other input received from op amp 184.

FIG. 3C represents the pulse width modulated output from comparator 198 resulting from the two inputs shown in FIG. 3B. FIG. 3D shows the waveform generated on lead 150 from flip-flop 210. It can be seen that this waveform has 1-second cycles and therefore represents the 60 Hz. waveform described previously. Assuming that the other input to gate 208 is normally high, the output from comparator 198 is transmitted directly through to gate 148. FIG. 3E thus represents the output from gate 148. This creates alternating pulses at comparator 152 which in turn alternately pulses transistor 154. This ultimately causes alternating pulses to occur on lead 60, as shown in FIG. 3F. Ultimately, alternating pulses are applied to the transformer as are represented in FIG. 3G by waveform 322. This produces the AC voltage on secondary coil 32 shown in FIG. 3H as waveform 324.

Switches

At low powers the $V_{ce}$ (on) of discrete transistors 106, 108 is very low, 0.1 volt to 0.5 volts, and the HFE is large making discretes very efficient at low powers. However, at high powers the HFE drops and the $V_{ce}$ goes up sharply. Darlington transistor 114 has a minimum $V_{ce}$ (on) of about 0.7 volts making them less efficient at low power than the discrete transistors. However, at high powers their $V_{ce}$ (on) rises very slowly and the HFE remains quite high. This means they are very efficient at high powers. The combination of both discrete and Darlington transistors provides for increased efficiency at both low and high powers. Also, as will be more clear from later discussion, the $V_{ce}$ (on) of the discrete transistors at low powers is used as a signal to indicate whether there is a load for the low-load responder.

When a diode is conducting it has a voltage drop of approximately ½ volt. It will be noted that an extra diode is connected to the gate or base of power Darlington 114 to assure that at lower powers, when a small amount of base current is provided on lead 60 by the driver Darlington transistor 100, the base current is not wasted on Darlington transistor 114. At higher powers, transistor 100 puts out more current making a higher voltage across resistor 110 connected to the base of the discrete transistors. This provides enough voltage on lead 60 to produce a voltage across both diodes 116, 118 in order to push current through resistor 112 and into the base of transistor 114. When transistor 100 is putting out its maximum current of approximately 5 amps, Darlington transistor 114 takes about 1 amp of the base current and the two discrete transistors get about 4 amps.

Power Base Current Control

The voltage from the collectors of the power transistors in switch 18 is fed to op amp 124 through resistor 134 where it is clamped by zener diode 136. The zener keeps the op amp from being damaged in its off state. When a power transistor is on, the amount of base current required to saturate it is, more or less, directly proportional to the collector current. Also, if the transistor is saturated, and $V_{ce}$ is more or less directly proportional to the collector current. Thus, by making the base current proportional to the collector-to-emitter voltage, saturation is obtained with a minimum of base current over a wide range of powers. This greatly increases the efficiency of the inverter at low powers.

Op amp 124 provides feedback control for the base current. The base current, identified at "A", is fed to the op amp through diode 126 which cancels out the base-to-emitter voltage of the discrete power transistors. Resistors 128, 130 provide the desired scaling and resistor 132 lowers the gain to prevent oscillation. Since this feedback loop senses both the base current and the $V_{ce}$ (on), it is immune to differences in transistors 100, 138. When the $V_{ce}$ (on) = 1.1 volts then transistor 138, and thus transistor 100, put out their maximum current. Variable resistor 144 is adjusted so that, at very low powers, the base current is less than 0.1 amp but not so low that the feedback circuit oscillates.

Voltage Regulation

Voltage regulation of the output is achieved using pulse width modulation. This is a very important feature since the battery voltage can vary from 11 volts to 14 volts. When one set of power transistors conducts it brings it's side of the primary almost to ground. At the same time, the other side of the primary goes an equal amount above the "+" battery voltage. This side of the primary is unloaded and so has no "IR" drop and gives a good representation of what the output voltage is. This can be seen particularly with reference to waveform 322 in FIG. 3G. The voltage on the unloaded side is actually a constant times the output voltage plus the "+" battery voltage. Thus, whichever half of the primary is unloaded (high) goes through diode 158 or 160 and is attenuated and inverted by op amp 166. The positive battery voltage is added along with a constant adjusted by potentiometer 182 in op amp 172. Feedback resistor 174 adjusts the magnitude of the resultant output. Both op amps 166 and 172 use the nominal ground of approximately 2.5 volts.

The output of op amp 172 is equal to the term $k(V_p - V_b) + c$, where $V_p$ is the unloaded side of the primary, $V_b$ is the positive battery voltage, and c is adjusted by potentiometer 182.

In order to make the power delivered to the load constant it is necessary for the signal for the feedback loop to be proportional to the square of the voltage averaged over time. Since it is a feedback loop, it is not necessary to take the square route of it for constant RMS voltage. Let $V_m$ be the middle voltage about which the output is to be regulated. If $V_o$ is the actual output voltage, then $V_o^2 = [V_m + (V_o - V_m)]^2 = V_m^2 + 2V_m V_o - 2V_m^2 + (V_o - V_m)^2$. If $(V_o - V_m)$ is much smaller than the $V_m$ then we can drop the $(V_o - V_m)^2$ term for an approximation. This gives $V_o^2 \approx 2V_m V_o - V_m^2 = k(V_o) + c = k(V_p - V_b) + c$. When c is adjusted, it also compensates for the offset that arises from using $V_g$ for ground. This approximation technique works easily within the accuracy required for an inverter and eliminates the expense and problems and complexity of using an analog multiplier. Capacitor 188 averages $V_o^2$ for a short time and potentiometer 194 adjusts the output voltage.

The final effect of this portion of the pulse width modulation circuit is that if $V_o^2$ (averaged) is low, then the inverting input to op amp 198 is lowered and the pulse width is widened, thereby completing the feedback loop. This effect can be seen with reference to the two input waveforms 310, 312 shown in FIG. 3B and the output waveform 314, shown in FIG. 3C, of op amp 198. Capacitor 202 helps to keep down oscillation. It should be noted that potentiometer 182 and 194 are adjusted together to compensate for all the combined inaccuracies of all the components.

Automatic Load Demand

Reference will now be made to the low-load responder 44 shown specifically in FIG. 2B. Responder 44 is also referred to herein as automatic low-load voltage reduction means. It can be seen that the non-inverting inputs of op amps 222, 224 sample the collector-to-emitter voltage of the power transistors. Potentiometer 226 provides for a level of comparison and AND gate 230 indicates when the output of both op amps is higher than this level at the same time. AND gate 232 samples only when either side should be on since one of its inputs is the output of op amp 198. Thus, if $V_{ce}$ (on) is greater than the adjusted value, because $I_c$ is greater than a specified value, then a positive signal is obtained from gate 232 that charges capacitor 240. Resistor 238 and diode 236 steady the signal even when the pulses are narrow. Thus, when the output load is greater than the adjusted value, the voltage at the inverting input of op amp 234 is higher.

Potentiometer 242 adjusts for the best comparison level. When op amp 234 is high, it turns on transistor 244 and cuts the "RMS" output to 41 volts by lowering the voltage applied to the non-inverting terminal of op amp 184.

Thus, when the load is below the specified value, the output pulse width is drastically narrowed, making for a tremendous energy savings at no-load. Potentiometer 226 is normally adjusted for a value equivalent to 20 watts. With the no-load narrow pulse width, the peaks maintain the same height so electronic power supplies of light electronic equipment still work. As soon as the load increases, transistor 244 is turned off and the full voltage reappears.

Circuit Protector

Reference is now directed specifically to circuit protector 46 shown in detail in FIG. 2B. A dual op amp and AND gate configuration very similar to that shown in the low-load responder is used. Op amps 250, 252 and AND gates 256, 258 indicate when $V_{ce}$ (on), and thus the $I_c$ of the power transistors is exceeding a value provided by the adjustment of potentiometer 254. However, this time it is adjusted for a level which is considered to be dangerous for the power transistors, which is satisfied by setting it at around 2–2.5 volts. When the $V_{ce}$ is above this at the same time AND gate 258 indicates that it is part of the "on" cycle, then the output of the gate goes high. Resistor 262 and capacitor 266 create a short time delay of about 0.8 milliseconds. After this short delay op amp 260 pulls the inverting input of op amp 270 high. This brings the input of AND gate 282 low. As a result, the "clear" terminal of flip-flop 292 is low. This immediately clears the "Q" terminal and ends the on-cycle of the corresponding switch prematurely by turning off AND gate 208.

When the next half cycle begins, pulse generator 204 clocks flip-flop 292, causing it to be reset. If the current becomes too large again then this premature ending of the on-cycle occurs again. Note that diode 264 brings capacitor 266 low as soon as the "Q" output of flip-flop 292 goes low. Thus, this capacitor starts out in a discharged or "low" state each half cycle.

An important advantage of this protector circuit is realized when the attached loads are inductive, such as with an inductive motor. In such a case the current increases with time within each half cycle so that the overload condition does not occur until partway through each cycle. As the motor comes up to speed, the current becomes lower and the protection circuit makes it a little further through the cycle. This "soft starting" greatly increases the starting power of the inverter.

Tests with this system show that the inverter can survive direct short circuits of the output under all conditions. When there is a short circuit, the unit just puts out alternating spikes of about 0.8 milliseconds. As soon as the load is decreased, the normal pulse width resumes.

If "Q" of flip-flop 292 spends more than about 15 seconds low, then capacitor 304 is brought low via resistor 300. Once this drops below the nominal ground voltage of 2.5 volts, then op amp 306 goes low and turns off AND gate 282. This clears flip-flop 292 and holds it clear until reset switch 302 momentarily recharges capacitor 304 to 5 volts. This gives the user 15 seconds to disconnect a load which the inverter can't handle without having to press the reset switch to resume normal operation.

This system has proven to be very reliable since it provides for low-load operation even during effectively short circuit conditions. This permits the transistors to work at a very high-load rate for extremely short periods of time. In an alternate configuration a bank of FET's are used instead of the switches shown in the preferred embodiment. Tests have shown that these transistors can survive very large currents for 0.8 milliseconds, even to the point of operating at conduction levels above 25 amps without hurting them, even though their continuous rating is only 12 amps. Another sided benefit is that as the transistors heat up, their "on" resistance goes up so it takes less current to make the overload circuitry work. This is very desirable, since it allows the inverter to put out enormous surges to start motors for short times but protects it at more reasonable levels for longer times.

This same circuitry operates to provide for low battery system turn-off as well. Potentiometer 272 and the voltage divider formed by resistors 274, 276 set the level for automatic turn-off due to a low battery voltage. Feedback resistor 280 associated with op amp 270 gives the lower battery cutout some hysteresis so that it does not turn on and off rapidly when the battery is near the cutoff voltage.

Spike Suppression

Finally, addressing the operation of spike suppressor 16, as shown in detail in FIG. 2A, the protection of the power transistors with spike suppression is seen to be provided. Very large spikes can appear from the inductance of the transformer due to the very quick turning off of the power transistors. This can cause secondary breakdown in those transistors. Diodes 84, 86 feed these spikes into 1000 microfarad capacitor 88. Transistor 92 drains the charge off of this capacitor over the rest of the cycle down to 18 volts. At 18 volts zener diode 94, also referred to as transistor bias means, turns off transistor 92. The capacitor absorbs the extremely high current spike since this would be difficult to do with just the transistor. An important feature of this spike suppression circuitry is that transistor 92 is connected at its emitter to the battery. This feeds the spike current back into the battery instead of to ground as is conventionally provided. This further improves on the efficiency of the overall circuit design.

It can be seen that the inverter as described herein is efficient even though the circuits are reasonably simple. This simplicity makes for much greater reliability as well as an affordable cost. Only very common circuit elements are used, with the exception of the power Darlingtons. Inverters have a reputation of eventually destroying themselves and this design has attempted to avoid this. The output of this inverter is a pulse whose width is varied automatically to compensate for changing battery voltages as well as changing losses due to the $V_{ce}(SAT)$ of the output transistors. When the battery voltage is about 12 volts, the pulse width is adjusted so that it is on ⅔ of the time. This ratio eliminates the third harmonic. Of course, as the battery voltage goes down, the pulse width gets wider to regulate the output voltage.

Further, it can be seen that this circuit, when it senses a load less than 25 watts, or other desirable limit, then the pulse width is cut substantially. This greatly reduces the no-load current draw for two reasons. First, the power transistors are on for a substantially shorter time period. Further, this narrower pulse width causes the transformer to act more like an ideal transformer since the flux density is much less. This permits the inverter of the preferred embodiment to operate at a no-load current of approximately 150 milliamps. In the no-load state the peak voltage is still about 155 volts which makes it possible to power light electronic devices.

The collectors of the power transistors are used as signals to determine the output voltage for the voltage regulating circuit. Further, they are used to determine the amount of driving base current needed to just barely saturate the power transistors. This is usually a big source of power loss. Also, it is used to determine if the load is over 25 watts. Since the collector-to-emitter voltage at saturation is a function of the collector current, then the voltage can be used to measure the load. As has been discussed, the collector-to-emitter voltage is also used to determine if the transistors are in danger of destruction by having too high a voltage when they are on. This triggers the circuit protector.

Additionally, it can be seen that pulse width modulation circuitry is provided which produces a linear approximation of the means square of the output voltage. This provides for reliable output voltage regulation.

While the invention has been particularly shown and described with reference to the foregoing preferred embodiment, it will be understood by those skilled in the art that other changes in form and detail may be made therein without departing from the spirit and scope of the invention as defined in the following claims.

What is claimed and desired to secure by Letters Patent:

1. An inverter circuit usable with a DC power supply having a pair of terminals comprising,
    a transformer having a primary coil with a center tap and two end taps, and a secondary coil, said center tap being connectible to one of the power supply terminals,
    switch means, including Darlington transistor means connected in parallel with discrete transistor means, each transistor means having collector, emitter and base terminals, responsive to a switch control signal, operatively connected to each primary end tap and connectible to the other power supply terminal for selectively alternately connecting each primary end tap to the other power supply terminal, wherein each switch means further includes current divider means operatively connected between the respective base terminals of said Darlington and discrete transistor means operative to apportion the switch control signal current flow between the two types of transistor means in such a manner that said discrete transistor means predominantly conducts during low level load current flow through the associated primary coil end tap and said Darlington transistor means predominantly conducts during high level load current flow, and switch controller means responsive to a representation of the voltage on the secondary coil for generating the switch control signal for each switch means.

2. The inverter circuit of claim 1, wherein said current divider means includes a portion associated with said discrete transistor means and another portion associated with said Darlington transistor means, each portion having resistance means and said other portion further having diode means not equivalently existing in said discrete transistor portion.

3. The inverter circuit of claim 1, wherein said switch controller means further includes driver means responsive to the collector-to-emitter voltage of said two types of transistor means for controlling the switch control signal level in such a manner that the switch control signal is proportional to the collector-to-emitter voltage.

4. The inverter circuit of claim 3, wherein said driver means is further responsive to the switch control signal for limiting the switch control signal to a level generally just sufficient to drive said transistor means at saturation.

5. An inverter circuit usable with a DC power supply having a pair of terminals comprising,
a transformer having a primary coil with a center tap and two end taps, and a secondary coil, said center tap being connectible to one of the power supply terminals,
switch means, responsive to a switch control signal, operatively connected to each primary end tap and connectible to the other terminal of said power supply for selectively alternately connecting each primary end tap to the other power supply terminal, and
switch controller means responsive to the non-load voltage level on the primary end tap not connected to the power supply when the other primary end tap is connected to the power supply, for generating the switch control signals.

6. The inverter circuit of claim 5, wherein said switch controller means further includes pulse generator means and pulse width modulation means connected to said pulse generator means for generating switch control signals having pulses with widths inversely related to the non-load voltage levels.

7. The inverter circuit of claim 6, wherein said pulse width modulation means includes means for deriving from said nonload voltage level an intermediate signal representative of a first-order linear approximation of the mean square voltage on said secondary coil.

8. The inverter circuit of claim 7, wherein each of said switch means further includes transistor means having collector and emitter terminals and being operable in a current-conducting state, and said switch controller means further includes automatic low-load voltage reduction means operatively connected to said modulation means and responsive, when a transistor means is in a conducting state, to the collector-to-emitter voltage on the one of said transistor means in a conducting state for altering the value of said intermediate signal to reduce the width of the corresponding control signal pulse sufficiently to substantially reduce the RMS value of the secondary coil voltage when the load provided to said secondary coil is less than a specified value.

9. The inverter circuit of claim 6, wherein said switch controller means further includes automatic low-load voltage reduction means operatively connected to said modulation means for reducing the width of the control signal pulses sufficiently to substantially reduce the value of the secondary coil voltage when the load provided to said secondary coil is less than a specified value.

10. The inverter circuit of claim 9, wherein each of said switch means further includes transistor means having collector and emitter terminals and being operable in a current conducting state, and said reduction means is responsive, when a transistor means is in a conducting state, to the collector-to-emitter voltage on the one of said transistor means in a conducting state, which collector-to-emitter voltage is representative of the load provided to said secondary coil.

11. The inverter circuit of claim 5, which further includes voltage spike suppression means, operatively connected between each primary end tap and the center tap, including spike-energy-retaining capacitor means connectible to the other power supply terminal and power-draining transistor means connectible to the one power supply terminal for draining energy retained by said capacitor means in to the power supply.

12. The inverter circuit of claim 6, which further includes current overload protection means comprising current sensing means for sensing when the load provided to said secondary coil exceeds a specified maximum value, switch control signal pulse termination means connected to said pulse generator means and connected between said sensing means, and said modulation means and delay means delaying the functions of said termination means after an excessive load is sensed by said sensing means by a first specified time period, thereby allowing switch control signal pulses to be generated having substantially shortened durations during excessive load conditions.

13. The inverter of claim 12 wherein said protection means further includes circuit disabling means connected to said termination means and said modulation means for disabling the operation of said modulation means after a minimum second specified time period during which an excessive load is sensed, the second specified time period encompassing a plurality of switch control signal pulses.

14. An inverter comprising,
a transformer having a primary coil with a center tap and two end taps and a secondary coil,
a DC power supply having a pair of terminals, one of said terminals being connected to the transformer primary center tap, switch means, including Darlington transistor means connected in parallel with discrete transistor means, each transistor means having a base-terminal responsive to a switch control signal and operatively connected between each primary end tap and the other power supply terminal for selectively alternately connecting each primary end tap to the other power supply terminal, said switch means further including current divider means operatively connected between the respective base terminals of said Darlington and discrete transistor means and operative to apportion the switch control signal current flow between the two types of transistor means in such a manner that said discrete transistor means predominantly conducts during low level load current flow through the associated primary coil end tap and said Darlington transistor means predominantly conducts during high level load current flow, and switch controller means including pulse generator means and pulse width modulation means connected to said pulse generator means and responsive to the non-load voltage level on the primary end tap not connected to the power supply when the other primary end tap is connected to the power supply for deriving an intermediate signal representative of a first-order-linear approximation of the mean square voltage on said secondary coil, which intermediate signal is used to generate switch control signals having pulses with widths inversely related to the mean square voltage on said secondary coil.

* * * * *